(12) United States Patent
Tingley, III et al.

(10) Patent No.: US 9,101,991 B1
(45) Date of Patent: Aug. 11, 2015

(54) METHOD AND APPARATUS FOR NON-SPINDLE MULTI-AXIS MACHINING

(71) Applicant: Tennine Corporation, Grand Rapids, MI (US)

(72) Inventors: William Q. Tingley, III, Grand Rapids, MI (US); William Q. Tingley, Grand Rapids, MI (US); Daniel R. Bradley, Grand Rapids, MI (US)

(73) Assignee: Tennine Corp., Grand Rapids, MI (US)

( * ) Notice: Subject to any disclaimer, the term of this patent is extended or adjusted under 35 U.S.C. 154(b) by 0 days.

(21) Appl. No.: 14/333,600

(22) Filed: Jul. 17, 2014

(51) Int. Cl.
*B23D 5/00* (2006.01)
*B23D 7/02* (2006.01)
*B23D 3/02* (2006.01)

(52) U.S. Cl.
CPC .. *B23D 5/00* (2013.01); *B23D 3/02* (2013.01); *B23D 7/02* (2013.01); *Y10T 409/500164* (2015.01); *Y10T 409/502624* (2015.01); *Y10T 409/502788* (2015.01); *Y10T 409/504428* (2015.01); *Y10T 409/504592* (2015.01)

(58) Field of Classification Search
CPC .............. B23D 1/02; B23D 1/04; B23D 1/08; B23D 1/10; B23D 1/12; B23D 1/20; B23D 3/02; B23D 3/04; B23D 5/00; B23D 5/02
USPC ................. 409/289, 292, 304, 305, 297, 301, 409/313–317, 321–324, 326–344; 72/324; 425/289
See application file for complete search history.

(56) References Cited

U.S. PATENT DOCUMENTS

| 1,084,544 A | 1/1914 | Hanson et al. |
| 1,327,881 A | 1/1920 | Roth |
| 1,912,666 A | 6/1933 | Swanson |
| 2,352,132 A | 6/1944 | Southwell |

(Continued)

FOREIGN PATENT DOCUMENTS

| EP | 1162018 A1 | 12/2001 |
| JP | 63-123603 A | 5/1988 |

(Continued)

OTHER PUBLICATIONS

Full Text Translation of JP 63-123603, which JP '603 was published in May 1988.

(Continued)

*Primary Examiner* — Daniel Howell
*Assistant Examiner* — Nicole N Ramos
(74) *Attorney, Agent, or Firm* — Frank M. Scutch, III

(57) ABSTRACT

A non-spindle multi-axis machining center (600) and method for forming a part using a non-rotating cutting tool (400) for removing material from a non-rotating workpiece within a three-dimensional work envelope. The non-spindle machining center makes obsolete the use of mills for profiling operations without the need to rotate the cutting tool to produce sufficient torque to remove material. Instead, the cutting tool (400) applies a linear cutting force to the workpiece along a one-, two-, or three-dimensional cutting path with sufficient impact to remove material by means of controlled fracturing instead of plastic deformation. Also, without the need to rotate, neither the cutting tool nor the part are constrained in shape by axial symmetry. Therefore, parts without restrictions in shape can be produced with higher material removal rates and finer surface finishes than by milling or turning.

17 Claims, 16 Drawing Sheets

(56) References Cited

U.S. PATENT DOCUMENTS

| | | | |
|---|---|---|---|
| 2,474,877 A | 7/1949 | Wilson | |
| 2,508,390 A | 5/1950 | Hungerford | |
| 2,532,591 A | 12/1950 | Armitage et al. | |
| 2,750,852 A | 6/1956 | Selvaggio et al. | |
| 2,936,679 A | 5/1960 | Thuerwachter | |
| 3,460,435 A | 8/1969 | Hucks et al. | |
| 4,404,882 A | 9/1983 | Mock | |
| 5,662,566 A | 9/1997 | Marxrieser et al. | |
| 5,765,976 A | 6/1998 | Ozaki et al. | |
| 5,842,819 A | 12/1998 | Meiler et al. | |
| 6,585,463 B1 | 7/2003 | Kaba | |
| 6,648,564 B2 | 11/2003 | Yamashita et al. | |
| 6,742,970 B2 | 6/2004 | Oles et al. | |
| 6,942,438 B1 | 9/2005 | Deguise | |
| 7,017,246 B2 | 3/2006 | Suzuki | |
| 7,670,013 B2 * | 3/2010 | Mimura | 359/534 |
| 8,579,563 B2 * | 11/2013 | Kimura et al. | 409/315 |
| 2003/0103829 A1 | 6/2003 | Suzuki et al. | |
| 2005/0141975 A1 * | 6/2005 | Hardesty et al. | 409/201 |
| 2007/0022591 A1 * | 2/2007 | Bernhard et al. | 29/33 P |
| 2008/0175684 A1 * | 7/2008 | Schmidt et al. | 409/211 |
| 2009/0019979 A1 * | 1/2009 | Kimura et al. | 83/72 |
| 2010/0111632 A1 * | 5/2010 | Tingley et al. | 409/293 |
| 2010/0119321 A1 * | 5/2010 | Tingley et al. | 409/293 |
| 2011/0011227 A1 * | 1/2011 | Tingley et al. | 83/39 |
| 2011/0123285 A1 * | 5/2011 | Matsuda et al. | 409/313 |
| 2012/0201623 A1 * | 8/2012 | Tingley et al. | 409/293 |
| 2012/0312133 A1 * | 12/2012 | Trzaskos et al. | 82/1.11 |
| 2014/0008340 A1 * | 1/2014 | Urata et al. | 219/121.76 |

FOREIGN PATENT DOCUMENTS

| | | |
|---|---|---|
| JP | 01-115501 A | 5/1989 |
| WO | 00/48786 A1 | 8/2000 |
| WO | 2008079151 A1 | 7/2008 |

OTHER PUBLICATIONS

Machinery's Handbook, 25th ed., by Oberg et al., published 1996, pp. 708-709.

Machine Translation of WO 00/48786, which WO '786 was published Aug. 2000.

* cited by examiner

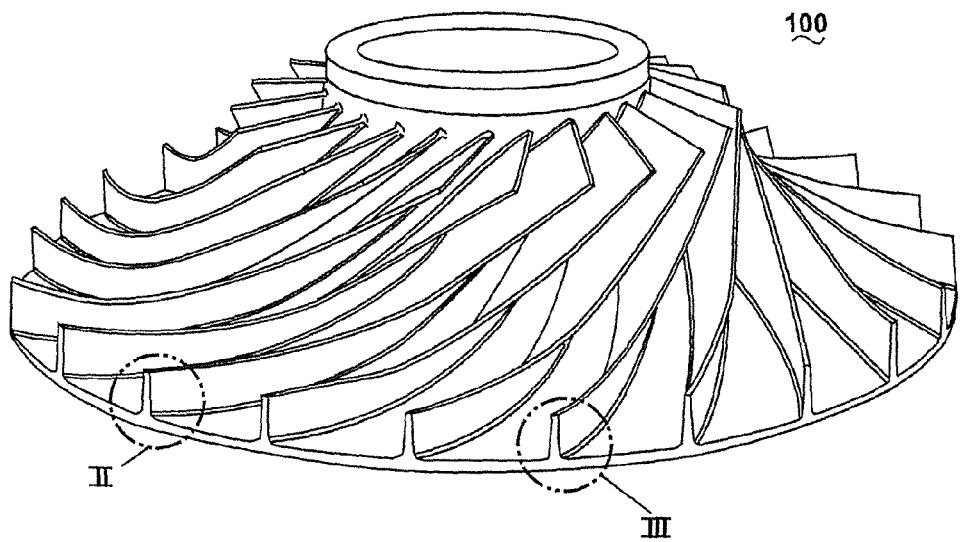
FIG. 1 (PRIOR ART)
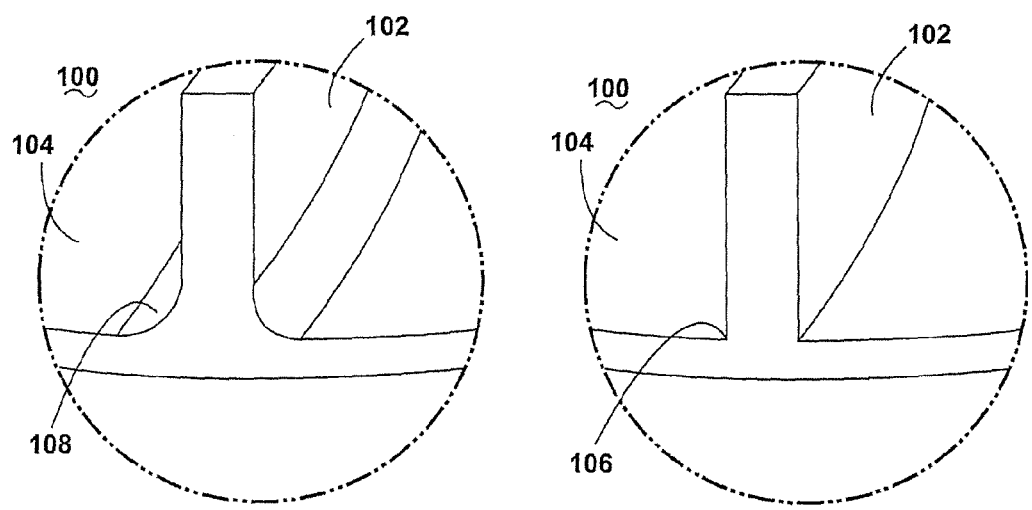
FIG. 2 (PRIOR ART)   FIG. 3

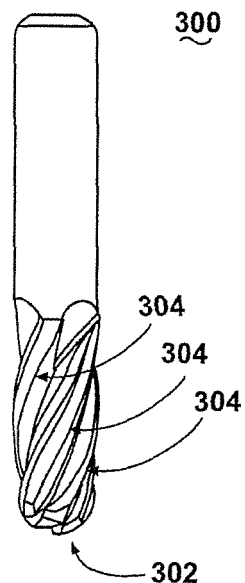
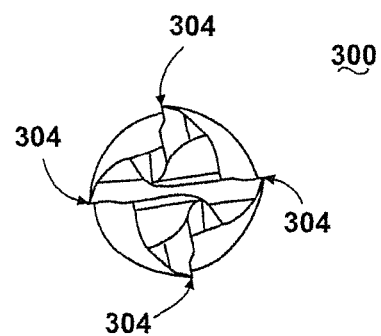
FIG. 6 (PRIOR ART)     FIG. 7 (PRIOR ART)
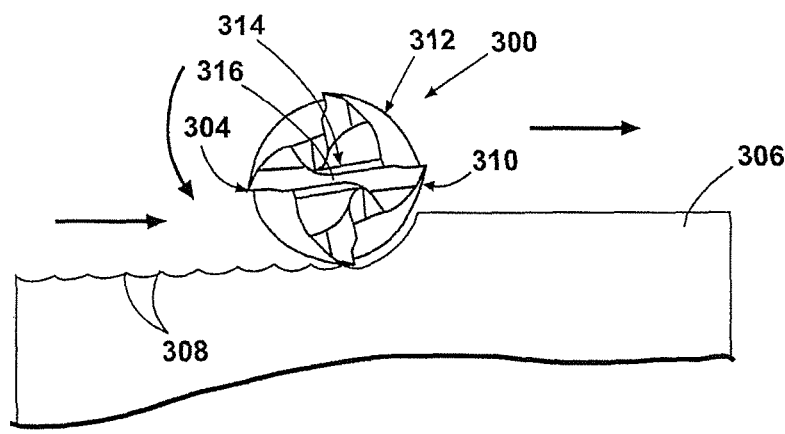
FIG. 8

METHOD AND APPARATUS FOR NON-SPINDLE MULTI-AXIS MACHINING

CROSS-REFERENCE TO RELATED APPLICATIONS

This application is related to U.S. patent application Ser. No. 12/520,785 entitled "METHOD AND APPARATUS FOR NON-ROTARY MACHINING." The aforementioned related application is hereby incorporated by reference in its entirety.

FIELD OF THE INVENTION

This invention relates generally to tools and methods for machining parts and, more particularly, to machines that are capable of performing profiling operations.

BACKGROUND

Milling is the machining process of using rotary cutters to remove material from a workpiece advancing or feeding in a direction at an angle with the axis of the tool. It covers a wide variety of different operations and machines, on scales from small individual parts to large, heavy-duty gang milling operations. It is one of the most commonly used processes in industry and machine shops today for machining parts to precise sizes and shapes.

Milling can be done with a wide range of machine tools. The original class of machine tools for milling was the milling machine which is often called "a mill". After the advent of computer numerical control (CNC), milling machines evolved into machining centers which are milling machines with automatic tool changers, tool magazines or carousels, CNC control, coolant systems, and enclosures), generally classified as vertical machining centers (VMCs) and horizontal machining centers (HMCs).

BRIEF SUMMARY OF THE INVENTION

Unlike the prior art machining techniques, the invention uses the non-spindle controlled-fracturing method to remove material from the workpiece without restriction to a one-dimensional work envelope. Controlled fracturing occurs when a material's yield strength and breaking strength are exceeded simultaneously. In other words, strain is instantaneous so there is no plastic deformation of the material being machined. Additionally, this also avoids attendant phenomena, like expansive heating and strain-hardening, which can chaotically complicate the machining process. Because prior art methods of contact machining are restricted to plastic deformation for removing material from a workpiece, complications are inherent in their operation and work to severely restrict performance in terms of productivity, precision, and applicability.

In order to avoid these shortcomings, the present invention's removal of material by controlled fracturing is useful for a number of reasons: (1) the present invention can remove material from a workpiece at a much higher rate by at least one or two orders of magnitude than prior art machining techniques; (2) the present invention mitigates and sometimes eliminates the chaotic effects of expansive heating and strain-hardening inherent in current methods of contact machining and so is more precise in the fit and finish it imparts to a part; (3) for the same reason, the invention can also produce shapes that are complex (e.g., highly curved airfoiling) and extreme (e.g., very thin cross-sections) that cannot be done using prior art machining methods; and (4) the invention is usable with materials, such as carbon fiber composites, which are typically too brittle for plastic deformation, i.e. their yield strength is identical to their breaking strength and so are difficult or impractical to machine by other prior art methods. Thus, a purpose of the present invention is to profile parts by means of contact machining more rapidly and precisely than existing art, including parts of shapes and materials that are impractical or impossible to profile with using machining techniques presently available in the art.

Various embodiments of the present invention use non-spindle contact machining not known in prior art to induce controlled fracturing to profile workpieces into finished shapes. The invention combines the superior capabilities of turning and milling without the limitation of either. Generally, a lathe produces parts at faster material removal rates and with finer surface finishes than mill. However, the profiling operation of a lathe is restricted to a two-dimensional work envelope which limits the parts it can produce to those with circular cross-sections. A mill can profile within a three-dimensional work envelope, which permits the production of parts with a greater range of shapes, although at a slower material removal rate and with a rougher finish than a lathe. The present invention combines the advantages of the lathe and the mill in profiling operations without their limitations by producing parts with an unrestricted range of shapes with very fine surface finishes at high rates of material removal.

The profiling operations of lathes and mills are limited because they rely upon the torque produced by spindle rotation to cut away material from the workpiece. However, spindle rotation imposes symmetry about the axis of rotation upon either the shape of the part to be produced or the cutting tool used. In the case of the lathe, the workpiece rotates and the cutting tool does not. It is the need to rotate the workpiece that restricts the lathe to a two-dimensional work envelope and so limits the parts a lathe can profile to those with circular cross-sections, i.e., axial symmetry. In the case of the mill, the cutting tool rotates and the workpiece does not. This permits a three-dimensional work envelope and so the profiling of parts within a wide range of open and closed surfaces that may be flat or curved (including Bezier curves). However, the need to rotate the cutting tool, which imposes axial symmetry upon it, limits the shape and surface finish that a mill can produce on a workpiece and the material removal rate at which it can do so. Moreover, the rough surface finish left by milling often necessitates a secondary grinding operation or polishing by hand to create a finer finish on a part, therefore adding time and expense to its production.

Machine tools that profile by means of non-spindle methods exist in prior art, including planers, shapers, broaching machines and, more recently, U.S. Patent Publication No. U.S. 62003/0103829 to Suzuki et al. and Japanese Patent No. 63-123603 to Koreda et al., which are herein incorporated by reference. However, none of these machine tools are capable of roughing and finishing the unrestricted range of shapes provided by the present invention. This is because the profiling operations these machine tools are either restricted to one-dimensional cutting paths within a two-dimensional work envelope or restricted to finish-machining operations of open surfaces.

An example of the former restriction is Suzuki, which discloses a method of cutting long, straight rails made of hardened steel. In this method a static, i.e., a non-rotating cutting tool is fixtured at a starting point within a two-dimensional work envelope to cut the workpiece along a linear one-dimensional path. To cut along a different one-dimensional path, the tool must be re-fixtured at a different starting point within the work envelope. Like all other methods of non-spindle machining in the prior art, this device is constrained to a one-dimensional cutting path within a two-dimensional work envelope. It cannot produce the parts illustrated by 100 in FIG. 3, 500 in FIGS. 15, and 500 in FIG. 16. Lacking three-dimensional motion within a three-dimensional work envelope, none of these non-rotary methods of machining can produce anything more than simple shapes on a workpiece and so have only highly specialized and severely limited applications.

An example of the latter restriction is Koreda, which discloses an apparatus for modifying a conventional computer-numerical controlled machining center to use a non-rotating cutting tool to finish-machine a workpiece already roughed to near net-shape by another process to a three-dimensional shape restricted to open surfaces. This invention lacks the capability to produce a shape that has closed surfaces—i.e., areas that are pocketed, concaved, stepped, or partially bounded by protrusions. For example, the vane 102 relative to surface 104 in FIG. 3, the cavity 508 relative to the plane defined by axes 502 and 504 in FIG. 15, and the cavity 512 relative to the plane defined by axes 502 and 504 in FIG. 16. It can only produce surfaces that are open—i.e., a flat or gently curved surface with no section that declines along the axis perpendicular to the plane of the surface. In other words, it cannot produce surfaces that require significant plunging of the cutting tool into the workpiece. Furthermore, this invention lacks the capability to both rough- and finish-machine a workpiece to net-shape. It is also limited, at best, to volumetric material removal rates typical of conventional methods of spindle machining.

BRIEF DESCRIPTION OF THE DRAWINGS

The present invention will now be described with reference to the accompanying drawings wherein like reference numerals in the following written description correspond to like elements in the several drawings identified below.

FIG. 1 is a perspective view of a prior art machined part that can be produced by the non-spindle multi-axis machining method of the present invention.

FIG. 2 is part view of the part depicted in FIG. 1 as machined by prior art milling techniques.

FIG. 3 is a partial view of the part depicted in FIG. 1 as machined by the present invention.

FIG. 6 is an elevation view of a prior art tool used in accordance with a prior art mill to machine the part as depicted in FIG. 2.

FIG. 7 is a bottom view of the tool depicted in FIG. 6.

FIG. 8 is a bottom view of the prior art tool depicted in FIGS. 6 and 7 as used to machine a part.

DETAILED DESCRIPTION

Figure 4:
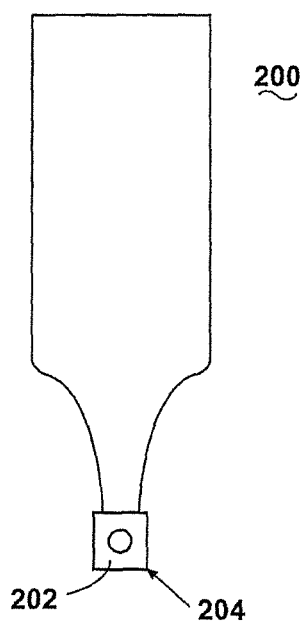
FIG. 4 is a front view of a non-spindle cutting tool used in accordance with an embodiment of the present invention to machine the part as depicted in FIG. 3.

There are two basic machining operations that are well known in the art. These might be broadly categorized as "profiling" where material is removed from a workpiece to produce a specified shape and surface finish and "holemaking" where material is removed from a workpiece to produce a drilled, tapped, or counter-bored hole. With regard to profiling, in order to profile a workpiece, there are three basic processes for removing material from a workpiece viz. deformation, electrolysis and ablation. Deformation is a process where a cutting tool, having at least one cutting edge, removes material from a workpiece by direct contact. This process is the least restricted in the shapes and materials that can be cut by the cutting tool. The "turning" and "milling" processes are the most common examples of deformation. Electrolysis is a process where a cathode electrochemically dissolves material from an anodized workpiece. This process is restricted to electrically conductive materials. Electrochemical and electrical discharge machining are examples of electrolysis. Finally, ablation is a process where a beam of energy vaporizes or erodes material from a workpiece. The ablation process is limited to flat work that lacks the requirement for three-dimensional features. Laser and waterjet cutting are examples of the ablation process.

In order to remove material by deformation, or sometimes called "contact machining", there are two basic methods. The first method is rotation of either the cutting tool or the workpiece about a spindle to provide sufficient torque to remove material. In turning, the workpiece rotates as the cutting tool moves through it. In milling, the cutting tool rotates as it moves through the workpiece. Spindle methods of machining impose axial symmetry upon either the cutting tool or the workpiece and thus limit volumetric rates of material removal, producible shapes, and precision of the finished part. The second method does not use a spindle. Neither the cutting tool nor the workpiece rotates. The force of linear motion of the tool relative to the workpiece alone is sufficient to remove material. However, unlike the spindle methods of machining, this method is severely restricted the shapes that can be produced. Shaping, planning, and broaching are examples of non-spindle methods of machining by deformation.

An embodiment of the present invention is directed to 1) driving a cutting tool through a workpiece without rotation by a spindle at a sufficiently high speed to remove material by means of controlled fracturing (2) along a three-dimensional path within a three-dimensional work envelope to produce precision flat and curved shapes with both open and closed surfaces (3) first by rough-machining the workpiece to near net-shape and (4) then finish-machining it to completion with a surface finish of 4 to 16 microinches or finer (5) at material removal rates of 20 cubic inches per minutes or more at feed rates of 5,000 inches per minute or more (6) without the expense of secondary operations and manual labor.

Comparison with the Prior Art.

The present invention is distinguished from current spindle and non-spindle machining methods and apparatuses for profiling operations by: (1) A non-rotating cutting tool that is unconstrained by axial symmetry (2) driven along a one-, two-, or three-dimensional cutting path (3) within a three-dimensional work envelope (4) to remove material from a non-rotating workpiece (5) at a sufficiently high speed to induce controlled fracturing to remove material without torque. No other method or apparatus for machining possesses all of these characteristics. As a consequence of these characteristics the present invention can: (1) rough-machine a workpiece to near net-shape and then precisely finish-machine it (2) to an unrestricted range of shapes with both open and closed surfaces, (3) including those with thin cross-sections, (4) at very fine surface finishes (5) at high volumetric rates of material removal. No other method or apparatus for machining can produce these results on a single machine tool in a single profiling operation. The comparison of these characteristics and capabilities between the present invention and prior art are illustrated in Table 1 below.

TABLE 1

COMPARISON OF CURRENT MACHINING METHODS TO NON-SPINDLE CONTROLLED-FRACTURE MACHINING METHOD

| Method | 1-D Tool Path | 2-D Tool Path | 3-D Tool Path | 2-D Work Envelope | 3-D Work Envelope | Complex Shapes | Thin Cross-Sections | Fine Finish | Rapid Mat'l Removal |
|---|---|---|---|---|---|---|---|---|---|
| Non-Spindle Controlled Fracturing | X | X | X | X | X | X | X | X | X |
| Milling | X | X | X | X | X | X | | | |
| Turning | X | X | | X | | | X | X | X |
| Shaping | X | | | X | | | | | X |
| Planing | X | | | X | | | | | X |
| Broaching | X | | | X | | | | | |
| Suzuki | X | | | X | | | | | |
| Koreda | X | X | X | X | X | | | | |

The present invention is most directly compared to the profiling operations of mills, because it mostly obsoletes the need for such. The primary utility a mill will retain is hole-making within a three-dimensional work envelope. The reason for this obsolescence is that the non-spindle machining method of the present invention can execute any profiling operation that a mill can: (1) Without any restriction of the shape required for the part (2) with a finer lathe-like surface finish, thus eliminating or reducing the need for grinding or polishing, (3) at material removal rates generally five to forty times faster. These advantages are a direct consequence of the present invention which does not require torque produced by a spindle as a force sufficient to remove material. This difference is well demonstrated by the significantly increased material removal rates of the present invention, as will be fully described later. Furthermore, an apparatus embodying this method will generally be less expensive, less complex, and sturdier than a comparable mill.

Unrestricted Range of Shapes.

Despite their significant disadvantages mills are presently used to machine parts with complex shapes, such as large die sets used in the automotive industry to form car roofs, hoods, and fenders or smaller precision components like impellers or the like. For example, FIG. 1 illustrates a perspective view of a prior art impeller 100 that can be produced by the non-spindle multi-axis machining center and methods of the present invention. The area depicted by "II" indicates a close-up as shown in FIG. 2 while the area "III" indicates that shown in the FIG. 3. Those skilled in the art recognize that amongst existing machine tools, mills are the least restricted in the shapes they can produce in a profiling operation. However, the need to rotate the cutting tool imposes the constraint of axial symmetry upon it. That, in turn, restricts to the shape of the tool the range of shapes that a mill can cut into a workpiece.

As specifically seen in FIG. 2 and FIG. 3 the differences in the type of cut using prior art milling techniques and the non-spindle machining method of the present invention are clearly illustrated. FIG. 2 illustrates a close-up of the type of cut as used with prior art milling techniques that create a radius between edges while FIG. 3 uses present machining methods to create an orthogonal edge. With regard to FIG. 3, an example of the process creates an orthogonal interior corner formed by the intersection of two curved surfaces. This type of surface cannot be produced using prior art milling techniques. Both FIGS. 2 and 3 illustrate an impeller 100 utilizing a series of vanes 102 that extend outwardly from a concave surface 104. As shown in FIG. 3, the intersection of a vane 102 and the surface 104 creates a sharp inside corner 106.

Figure 5:
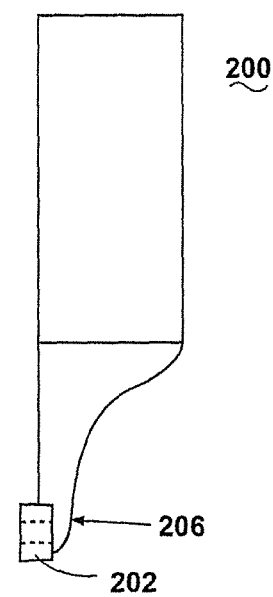
FIG. 5 is a side view of the tool depicted in FIG. 4.

FIG. 4 is a front view of a non-spindle (i.e., non-rotating) cutting tool used in accordance with an embodiment of the present invention used to machine the part as depicted in FIG. 3. FIG. 5 is a side view of the tool depicted in FIG. 4. Because the machining method of the present invention employs a non-rotating cutting tool 200, axial symmetry is not a requirement for the tool. Therefore, the tool 200 does not need to be relieved in all directions to clear the curved surfaces 102 104 of the impeller 100. The tool 200 needs only to be relieved on the posterior side 206 that is perpendicular to the direction of its cutting path. Therefore, the tool's cutting edge 202 can feature a sharp corner 204 which can be continuously re-oriented along the cutting path of the corner 106, by means of the present invention, to machine it as specified. For this reason, the present invention, unlike a mill, is unrestricted in the shapes it can cut in a profiling operation.

FIG. 6 is an elevation view of a prior art tool used in accordance with a prior art mill to machine the part as depicted in FIG. 2. FIG. 7 is a bottom view of the tool depicted in FIG. 6. In order to cut the side of the vane 102 and the concave curve of the surface 104 to specification, a mill must use an axially symmetrical cutting tool like that shown in FIG. 6. As seen in FIGS. 6 and 7, the tool 300 includes a spherical nose 302 and cutting edge 304. The tool 300 is relieved in all directions to clear the curved surfaces 102, 104 specified for the impeller 100. FIG. 2 illustrates the prior art techniques where the vanes 102 and the concave surface 104 of the milled impeller 100 are to specification. Instead of the sharp inside corner 106 as seen in FIG. 3, at their intersection is a large radius 108 conforming to the spherical nose 302 of the mill's rotating cutting tool.

Finer Surface Finishes.

Even when a mill can profile a shape to its specified dimensions, it will leave a rough or scalloped edge. As noted above, prior art FIG. 8 illustrates the cutting tool 300 as frequently used by a mill in profiling operations. The tool 300 includes a number of cutting edges 304, called flutes, which cut material away from the workpiece 306 as the tool 300 rotates. Because the flutes 304 are spaced apart from each other, material is not cut away constantly from the workpiece 306. Instead, the material is only cut away during the time when one of the four flutes 304 is in contact with the workpiece 306. Consequently, the removal of material by the rotating tool 300 is not consistent as it moves through the workpiece 306. The result is an uneven surface marked by a series of scallops 308. If these scallops 308 are excessive or otherwise unwanted, it is necessary to grind or manually polish the workpiece 306 after completion of the profiling operation on the mill to produce a sufficiently fine finish on the completed part.

Figure 9:
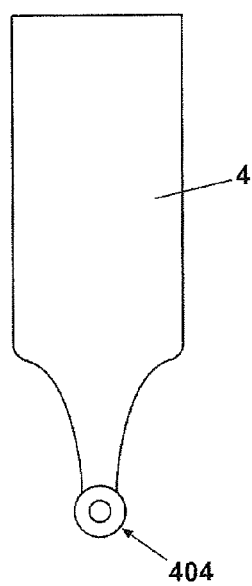
FIG. 9 is a front view of a non-spindle cutting tool used in accordance with various embodiments of the present invention.
Figure 10:
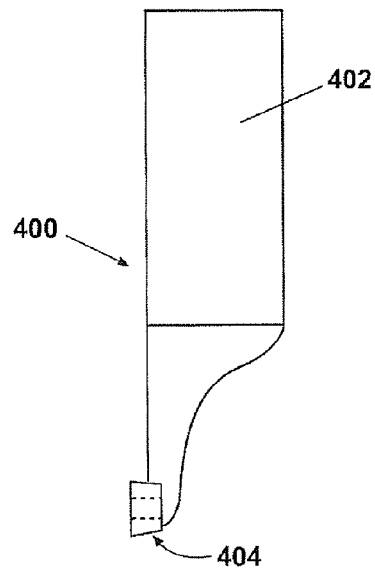
FIG. 10 is a side view of the tool depicted in FIG. 9.
Figure 14:
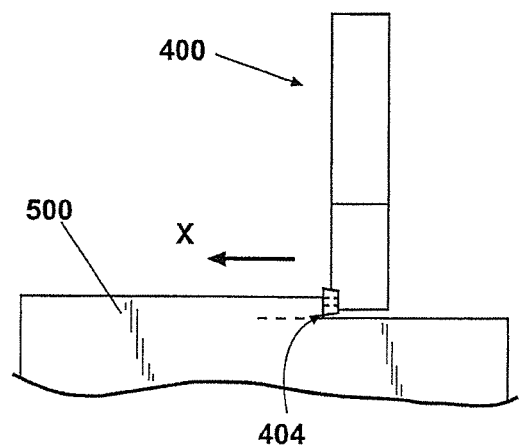
FIG. 14 is an elevation view of the tool depicted in FIGS. 9 and 10 being used to machine a part in accordance with one aspect of the present invention.

FIG. 9 is a front view of a non-spindle cutting tool used in accordance with various embodiments of the present invention while FIG. 10 is a side view of the tool depicted in FIG. 9. Unlike the flutes 304 of a mill's rotating cutting tool 300, FIGS. 9-10 illustrate the non-rotating tool 400 with a cutting edge 404 that, when employed by the present invention in a profiling operation, is in constant, stable contact with the workpiece 500 as depicted in FIG. 14. As a result, there are no scallops left on the cut surface of the workpiece 500. For this reason, the present invention produces a much finer surface finish in a profiling operation than a mill does, thus eliminating or reducing the need for subsequent grinding or polishing.

Faster Material Removal Rates.

Figure 11:
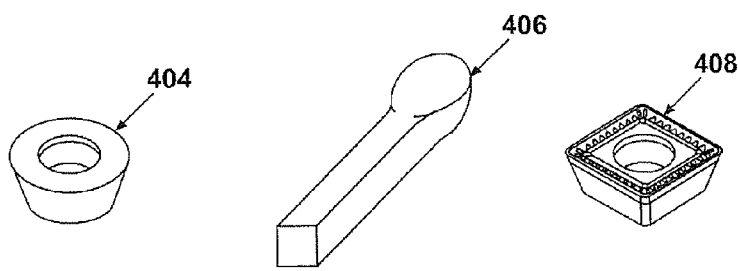
FIG. 11 illustrates perspective views of different insertable cutting edges for the tool depicted in FIGS. 9 and 10.

FIG. 11 illustrates perspective views of different insertable cutting edges for the tool depicted in FIGS. 9 and 10. Alternatively to that shown in FIGS. 9-10, the non-spindle cutting tool 400 may include a cutting edge 404 that is either inserted into or integral to the tool body 402. It should be evident to those skilled in the art that the cutting edge 404 is illustrated as a "circular edge" that may be altered to a sharp point, square face 408 or other geometries such as shown in FIG. 11 to machine the desired shape and surface finish on a workpiece.

Figure 12:
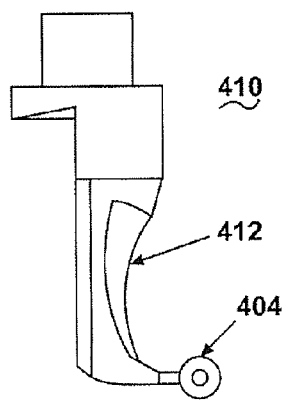
FIG. 12 is a front view of an axially asymmetric non-spindle cutting tool used in accordance with various embodiments of the present invention.
Figure 13:
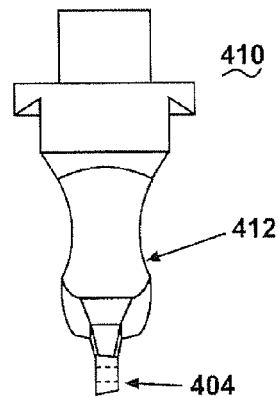
FIG. 13 is a side view of the tool depicted in FIG. 12.

FIG. 12 illustrates a front view of an axially asymmetric non-spindle cutting tool used in accordance with various embodiments of the present invention. FIG. 13 is a side view of the tool depicted in FIG. 13. The tool body 412 can be of any shape necessary to support the cutting edge 404 while providing relief for it to machine deep or other spatially constrained features into a workpiece. An example of this tool body is illustrated in FIGS. 12-13. Often a non-rotating cutting tool 400 such as that depicted in FIGS. 9-10 will be the same as, or similar to, cutting tools used for turning. This is due to the fact that the non-spindle machining method of the present invention does not restrict the operation of the tool as does turning to a two-dimensional cutting path within a two-dimensional work envelope. Therefore, a non-rotating cutting tool can possess cutting edges, tool body shapes, and asymmetrical features not found in turning tools to machine complex shapes not possible with turning.

FIG. 14 illustrates a non-spindle cutting tool 400 removing material from a workpiece 500 in accordance with an embodiment of the present invention. Once in contact with the workpiece 500 the cutting edge 404 of the tool 400 is continuously engaged in a uniform cutting motion that removes material with a constant force. This is in sharp contrast to the variable force of the rotating cutting tool 300 used by a mill in a profiling operation, as depicted in FIG. 8. In that instance each flute 304 of the tool 300 rotates towards the workpiece 306 and swings from no engagement to full engagement to no engagement again. The variation in force is the result in the change of the chip load of the tool 300 as the mass of material that the flute 304 is removing increases from zero to full chip load to zero again. Furthermore, the force of a rotating cutting tool 300 also varies because its acceleration decreases from maximum surface footage at its outside diameter to zero at its centerline, so that the nature of its cutting motion ranges from shearing at the maximum radial extent of the flute 310 to tearing along most the flute's edge 312 to scraping along its bottom 314 to pushing through material at its center 316.

The difference between the two types of cutting motions is that a rotating cutting tool 300 leaves a series of scallops 308 from side-cutting on the surface of the workpiece 306 and a rough finish from bottom-cutting, whereas a non-rotating cutting tool 400 leaves a smooth finish on the workpiece 500. This is because the variable force of a rotating cutting tool 300 has the effect of mostly tearing material away from the workpiece 306 rather than shearing it as does a non-rotating cutting tool 400 from the workpiece 500. Additionally, by shearing material with constant force to remove it rather than tearing it away with variable force, the non-spindle multi-axis machining method can produce parts with thinner cross-sections more precisely, more quickly, and with less scrap than is possible with milling. Also, shearing instead of tearing keeps the heat from the friction of the cutting motion in the chip rather than the cutting tool 400 or the workpiece 500, which improves tool life and reduces defects and distortions in the finished part, especially those with complex shapes or thin cross-sections. Less obvious is that the variable force of a rotating cutting tool 300 introduces a much larger element of chaos into the cutting motion than does the constant force of a non-rotating cutting tool 400. This disorder, often manifesting itself as chatter, increases the unpredictably of a profiling operation on a mill compared to the present invention and therefore significantly restricts the range, performance, and productivity of mills even for simple operations. The constancy of force in the cutting motion of a non-rotating cutting tool 400 along a three-dimensional path through a three-dimensional work envelope is the essence of the present invention which cannot be replicated by any machining method or apparatus of prior art.

The stable, constant cutting force that the present invention applies through a non-rotating cutting tool ensures that energy is not drawn away from the task of material removal in the form of chaotic motion such as chatter. Therefore, constancy of the cutting force is critical to increasing the material removal rate of the present invention in comparison to milling. Even more fundamental to the present invention's significantly faster material removal rates is that, unlike a mill, none of the cutting force delivered to the cutting tool is torque. Because the rate of material removal is the result of the depth of cut multiplied by the width of cut multiplied by the cutting tool's linear rate of the motion through the workpiece, the torque of rotating tool is not a direct factor. Consequently, the cutting force that a mill delivers as torque is a force that does not contribute significantly to the linear rate of motion of the cutting tool through the workpiece. Table 2 compares the non-spindle method of the present invention to milling for four common machining operations using the best practices for each to illustrate the greater material removal rates of the present invention by factors of 12, 23, 33, and even 200. For this and the other reasons stated above, the present invention can remove material from a workpiece in profiling operations at rates generally 5 to 40 times faster than a mill.

TABLE 2

COMPARISON OF MATERIAL REMOVAL RATES
FOR TYPICAL ALLOY STEEL WORKPIECE

| Operation | Machining Method | Cutting Tool | Depth of Cut (mm) | Width of Cut (mm) | Cutting Speed (m/min.) | Feed Rate (m/min.) | Material Removal Rate (c.c./min.) | Non-Spindle/ Milling Comparison |
|---|---|---|---|---|---|---|---|---|
| surfacing | milling per prior art | 110 mm dia. carbide inserted surface mill | 0.25 | 100 | 150 | 2.0 | 50.0 | 12 |
| | non-spindle per present invention | 20 mm dia. carbide inserted cutter | 6.5 | 1.5 | n/a | 60 | 582 | |
| side milling | milling per prior art | 20 mm dia.carbide end mill | 10 | 18 | 45 | 0.18 | 32.4 | 23 |
| | non-spindle per present invention | 10 mm wide carbide inserted cutter | 3.3 | 7.5 | n/a | 30 | 743 | |
| rough contouring | milling per prior art | 20 mm carbide inserted ball-nose end mill | 3.3 | 4 | 300 | 1.5 | 19.8 | 33 |
| | non-spindle per present invention | 20 mm dia. carbide inserted cutter | 6.5 | 3.3 | n/a | 30 | 644 | |
| finish contouring | milling per prior art | 3 mm dia. carbide ball-nose end mill | 0.6 | 0.25 | 120 | 1.0 | 0.15 | 200 |
| | non-spindle per present invention | 3 mm dia. carbide inserted cutter | 1.0 | 0.25 | n/a | 120 | 30 | |

Deformation by Controlled Fracturing.

Figure 21A:
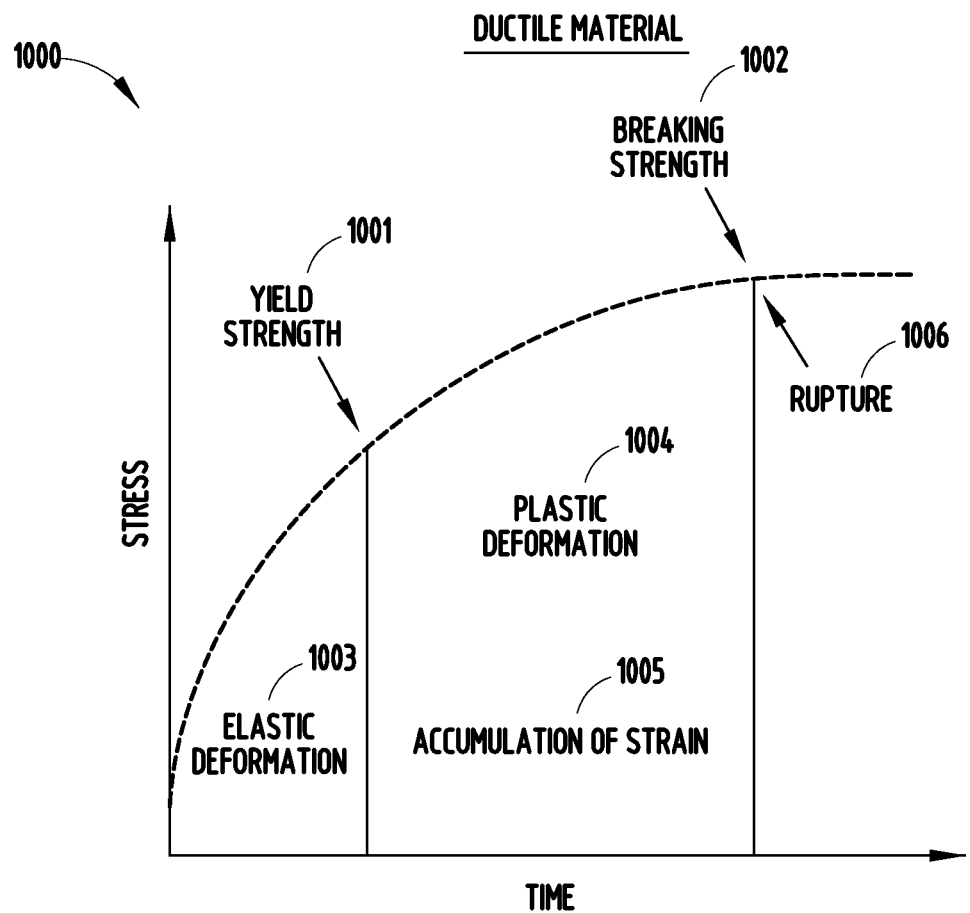
FIGS. 21A, 21B and 21C are chart diagrams illustrating elastic, plastic, and controlled-fracture phases respectively of deformation.
Figure 21B:
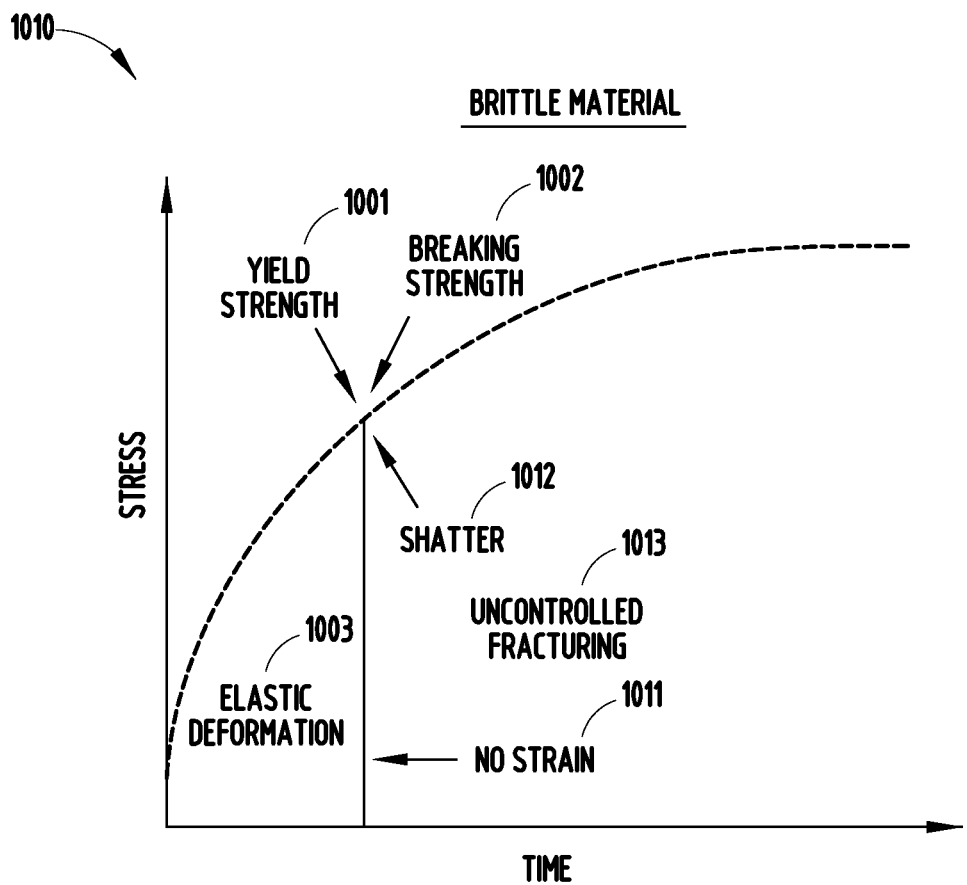
Figure 21C:
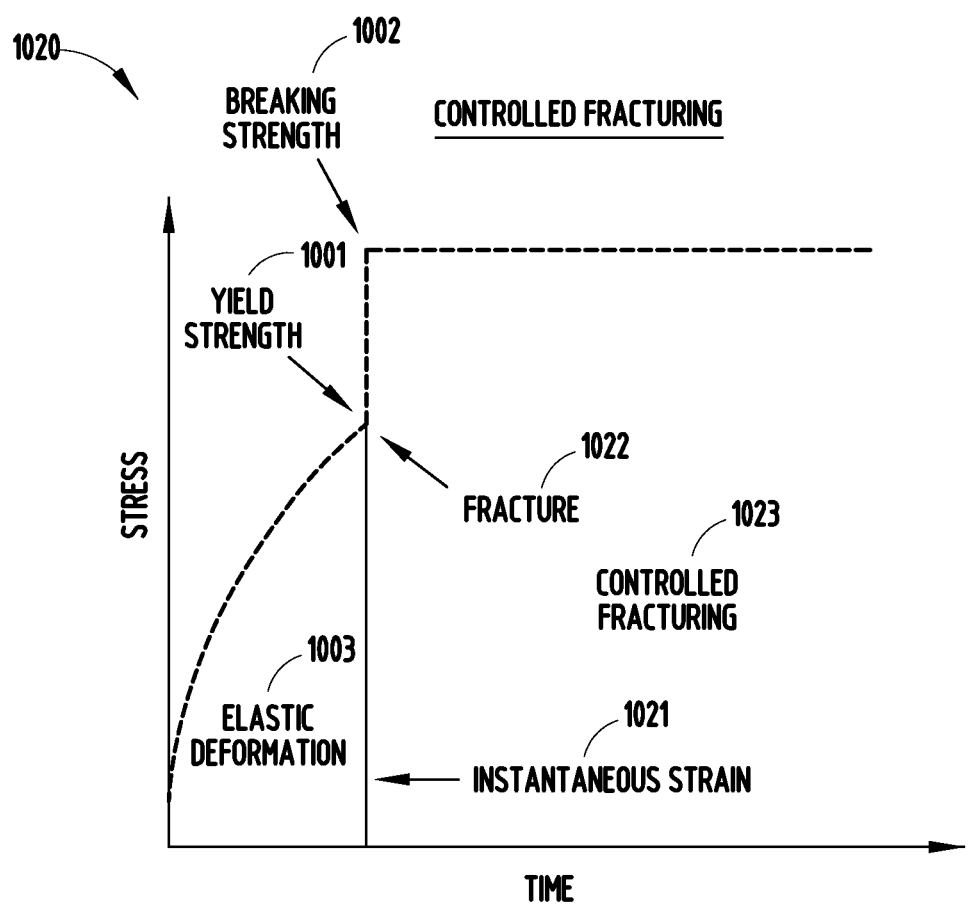

The invention's high volumetric rate of material removal are made possible by inducing controlled fracturing in the workpiece. FIGS. 21A, 21B and 21C are charts illustrating the nature of the elastic, plastic, and controlled-fracture phases of deformation. As seen in these charts, depending upon the force driving the cutting tool through the workpiece, the present invention removes material from the workpiece by either plastic deformation 1004 or controlled fracturing 1023. In both cases, it does so at volumetric rates of material removal one or two orders of magnitude greater than that of existing art. However, controlled fracturing 1023 is the superior process, because it mitigates or eliminates the expansive heating and strain-hardening that characterize plastic deformation 1004. These effects cause difficulties in the machining process by degrading speed and precision; limiting the range of shapes and materials that can be machined; shortening machine and tool life; and destabilizing production with unpredictable factors. To the extent that the cutting force that the present invention applies to the material of a workpiece approaches instantaneous strain 1021, and achieves controlled fracturing 1023, the period of plastic deformation 1004 is reduced and so are its adverse effects.

As described herein, controlled fracturing 1023 offers the ideal level of deformation in a profiling operation, and is the process of contact machining that works to achieve certain predefined goals. As seen in each of FIGS. 21A and 21C, deformation of a ductile material occurs at three levels 1003, 1004, and 1023. The first level is elastic deformation 1003, in which the material will return to its original shape once it is relieved of stress. If the stress exceeds the material's yield strength 1001, then the second level, plastic deformation 1004, is reached and the material is permanently deformed. The continued application of stress to a plastically deformed material will cause strain to accumulate 1005 until it exceeds the material's breaking strength 1002 allowing it to rupture 1006. For the methods of contact machining in existing art, this level of deformation is the best that can be achieved and is observed as the cutting tool 300 operating to separate irregularly chipped material 308 from a workpiece 316.

Generally, the longer it takes strain to accumulate 1005, the greater are the effects of expansive heating and strain-hardening, and the more severe is the resulting chaos in the material removal process. Therefore, reducing or even eliminating the time it takes the accumulation of strain 1005 to rupture 1006 a material is desirable. Thus, the ideal is instantaneous strain 1021, in which a material's yield strength 1001 and breaking strength 1002 are exceeded at the same time. This, in effect, makes a ductile material 1000 behave like one that is brittle 1010, in which no plastic deformation 1004 occurs as a cutting tool 400 removes material from a workpiece 500, as graphed in FIG. 21B. Instead of pulling a material apart by rupturing it 1006, the force of the cutting tool cracks 1022 the workpiece along lines of fracture to separate pieces of material, as seen in FIG. 21C. This process is termed "controlled fracturing" 1023, which is the third level of deformation. The shape, orientation, and direction of the tool's cutting edge determine how the material will fracture 1022 by concentrating the heat generated from the cutting tool's 400 contact with the workpiece 500 into adiabatic bands emanating from the perimeter of the cutting edge 404 in the direction of the cutting tool's motion. The heating within these bands causes micro-cracks to form which then connect under the continued stress of the cutting force and fractures material loose from the workpiece along a line conforming to the perimeter of the cutting edge 404 406 408. The present invention controls these cutting tool factors to produce the desired shape and finish without the adverse effects of plastic deformation 1004 that limit the performance of all other methods of contact machining in existing art.

Thus, embodiments of the present invention induce controlled-fracturing in the workpiece by an abrupt, localized, and extreme force of the cutting tool against the workpiece that exceeds the ultimate shear strength of the material of the workpiece. This force is in the form of an impact which, because of the speed at which the cutting tool moves through the workpiece, the material of the workpiece does not have time to respond by deforming plastically and instead fractures. The fracturing is controlled by maintain the speed and direction of the cut and the outside contour of the cutting tool. To wit, shear bands form in the workpiece as a microstructure of cracks emanating in the direction of the cutting tool within the outside contour of the cutting tool as projected into the workpiece. Under the continued impact of the cutting tool moving through the workpiece, this microstructure softens relative to the uncut material surrounding it, because the cracked material becomes highly fractured, even to the point of recrystallizing. Once softened the cutting tool shears this material from the workpiece as waste retaining almost all of the heat generated by the process, because its microstructure of cracks retards the transfer of heat to material outside of the microstructure. The end result of this controlled-fracturing process is a shape cut into the workpiece with the same contour as the cutting tool.

The force sufficient to propagate the shear bands for controlled-fracturing varies with the material of the workpiece. The cutting tool must apply at least 60,000 pounds of force per square inch of areal contact with the workpiece if it is cold-rolled mild steel; 80,000 pounds for alloy steel; 150,000 pounds for stainless steel; 50,000 pounds for titanium; 20,000 pounds for aluminum; and 50,000 pounds for aluminum-bronze. The methods defined herein apply these forces without a spindle in three or more dimensions simultaneously. Consequently the only restrictions upon the volumetric rate of material removal are the surface footage, depth of cut, and width of cut limitations of the cutting tool. This distinguishes the invention from machining processes in prior art, in which the volumetric rate of material removal is restricted by the cutting tool's limitations, the imposition of axial symmetry by the machine tool's spindle, and/or the absence of a second or third dimension in the machine tool's work envelope. The end result is the optimization of the cutting tool's performance to its ideal.

Terms of Art.

With regard to the open and closed surfaces as described herein, those skilled in the art will further recognize that the method described herein will inherently machine a closed surface. An open surface may be defined as the flat, sloping, convex, or similar surfaces of a workpiece that can be machined without any motion (or any component of multi-axis motion) along a cutting path toward the workpiece. The term "plunging" is a cutting path that has a component of motion toward the workpiece. A "closed surface" is either one that requires "plunging" to machine or one in which another surface interferes with the plane perpendicular to it. As compared to the prior art, an advantage of the present invention is techniques as used in the prior art are limited to machining only open surfaces.

With regard to straight versus curved cutting paths, machining along a straight cutting path is a capability inherent in a curved path. Those skilled in the art will recognize that a curved cutting path is in fact a series of extremely short straight paths arranged and/or oriented in a "stair step" manner and is often used in connection with a numerical-controlled mill or lathe. Thus, an aspect of the controlled fracturing process is that in the absence of axial symmetry imposed upon either the cutting tool or the workpiece by the spindle of a mill or lathe, a cutting tool of unrestricted shape can move in any cutting path allowing for precision removal of material producing either a roughed surface (i.e. near net-shape) or a finished surface (i.e. exact net-shape) on the workpiece.

With regard to the processes or roughing versus finishing, the process of "roughing" means to machine to near net-shape with a surface that is "less fine" (a machining term of art) than the finish specified for the completed surface at net-shape. A cutting tool used for roughing removes material from the workpiece faster than a cutting tool used for finishing. This occurs since the tool's cutting edge typically has a greater radius and therefore can make cuts at greater volumetric rates of removal through the workpiece. In addition to the appropriate cutting tool, roughing requires a machine tool, fixturing of the workpiece to the machine tool, and fixturing of the cutting tool to the machine tool that is sufficiently rigid to prevent vibrations from the motion of the cutting tool through the workpiece from distorting the intended cutting path. In contrast to the prior art, the methods of controlled fracturing are not restricted to finishing and can be employed for both "roughing" and "finishing" to the extent that a particular combination of machine, fixture, and cutting tool makes possible.

As for processes using rotation and rotary motion, those skilled in the art will recognize that a "spindle" is not a "rotary axis. The term "rotation" means rotation of a machine tool's spindle. This rotation produces sufficient torque for a cutting tool to remove material from a workpiece. The force provided by rotation is applied either by attaching a cutting tool to the spindle (as in a milling process), or by attaching a workpiece to the spindle (as in a turning process). Machining with a spindle imposes axial symmetry upon either the cutting tool (as in milling) or the workpiece (as in turning). Axial symmetry is symmetry around the axis of a rotating spindle. Axial symmetry greatly restricts the finished shape of the workpiece, the volumetric rate of material removal, and the fineness of the surface finish. It also increases chaos in the movement of the cutting tool relative to the workpiece. Milling and turning as methods of spindle machining suffer these problems in contrast to the non-spindle method of controlled-fracture machining. Because it does not impose axial asymmetry upon either the cutting tool or the workpiece, it is a method of machining all surfaces along three-dimensional cutting paths without the limitations in volumetric rate of material removal, finished shapes, fineness of surface finishes, and chaotic motion that are inherent in spindle machining.

"Rotary-axis motion" is unrelated to spindle rotation. It is the rotation of a linear axis, conventionally labeled as the A-axis, B-axis, and C-axis in correspondence with the associated linear axes X, Y, and Z. Rotary-axis motion does not to produce torque to increase cutting force, which is the purpose of spindle rotation. Instead, it either indexes or continuously changes the "orientation" of the cutting tool—i.e., the angle of the face of the cutting tool relative to the surface being machined on the workpiece. Those skilled in the art will also recognize that the term "torque" means a twisting force applied to the workpiece and the term "orientation" can also be expressed in terms of the cutting edge of the cutting tool, although as a term of art the reference is typically to the face of the tool. Rotary-axis motion is a component, like linear-axis motion, of the cutting path. With regard to the terms "precision" and "fine finish", as used herein "precision" means how closely the workpiece is machined is to within the tolerances of the specified dimensions of the completed part i.e. net-shape. "Fine finish" means how closely the workpiece is machined to the specified surface finish of the completed part. The term "controlled fracturing" occurs when the strain in a workpiece accumulates instantaneously under the force of the cutting tool. In other words, the time it takes strain to accumulate between the point of elasticity and the break point is zero. This occurs in brittle materials because they have no elasticity. The result is chaotic rupturing of the materials. However, in controlled fracturing, non-brittle materials behave like brittle ones except that the rupturing is not chaotic. This is because their plasticity allows the shape of their rupturing to be controlled by the cutting edge of the cutting tool. Finally, those skilled in the art will further recognize that each cutting path is independent of the previous path; therefore, it is not the multiplicity of paths but their unrestricted movement along a machine tool's linear or rotary axis, or simultaneously along more than one axis, which makes the controlled fracturing process unique.

Embodiments of the Apparatus.

Figure 15:
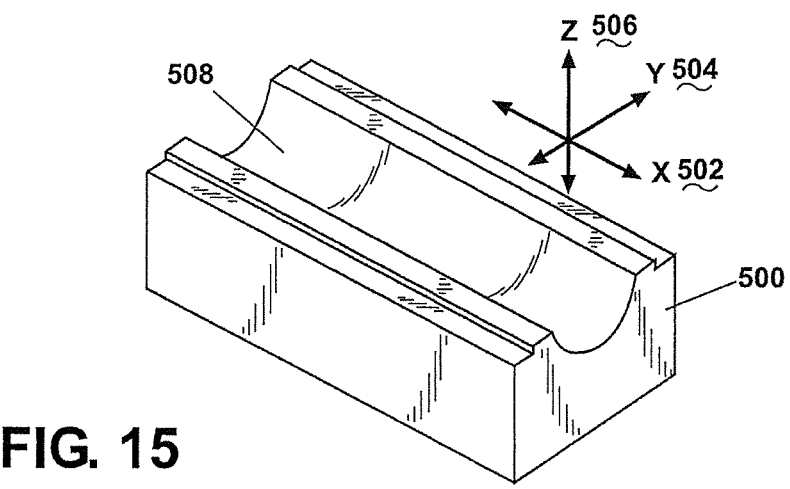
FIG. 15 is a perspective view of a part machined in accordance with the "3-axis" embodiment of the present invention.
Figure 16:
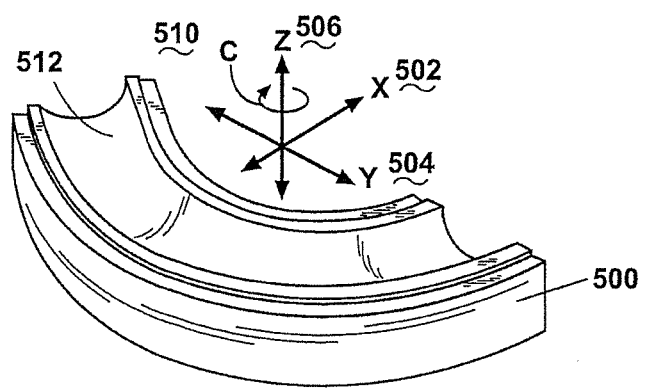
FIG. 16 is a perspective view of another part machined in accordance with the "4-axis" embodiment of the present invention.
Figure 17:
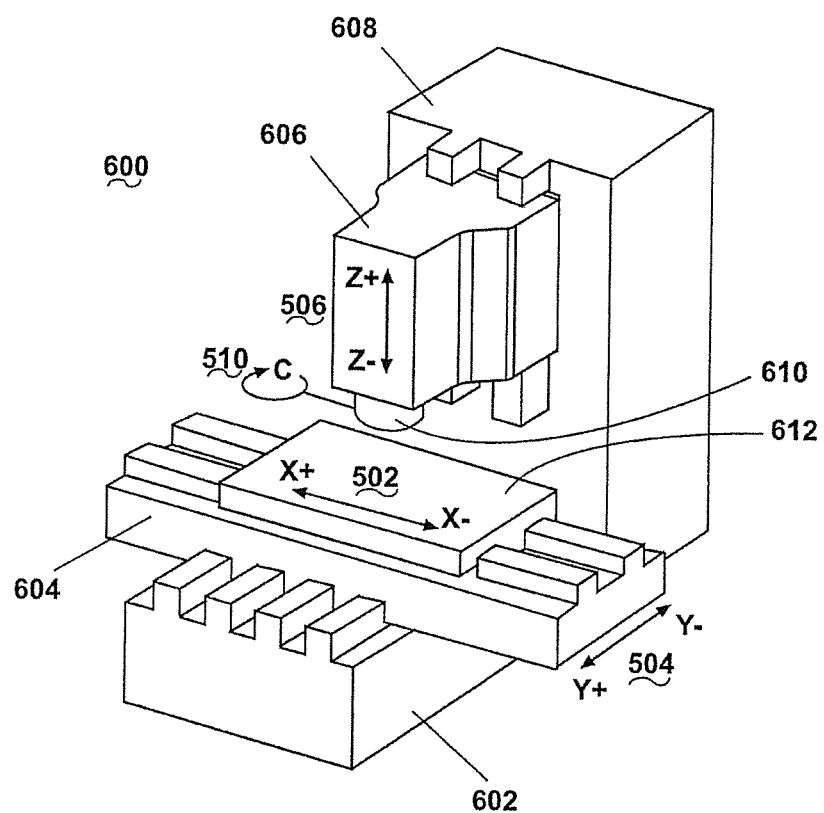
FIG. 17 is a perspective view of a non-spindle machining apparatus in accordance with the "3-axis" and "4-axis" embodiments of the present invention.

FIG. 17 is a perspective view of a non-spindle machining apparatus in accordance with the "3-axis" and "4-axis" embodiments of the present invention. The apparatus employing the non-spindle multi-axis machining method of the present invention can be embodied in a variety of configurations. In contrast to that shown in FIG. 17, these embodiments are comparable to those of computer numerical controlled mills (known in the trade as "machining centers"), except that the present invention does not use a spindle to rotate a cutting tool. Instead, as seen in FIG. 9, a non-rotating cutting tool is used in accordance with various embodiments of the present invention. In this illustration a tool holder 610 replaces the spindle into which a non-rotating cutting tool 400 is affixed. The simplest embodiment of the present invention is a "3-axis" machine 600, which can drive the cutting tool along any one of the three linear axes (commonly known as the X-, Y-, and Z-axes) 502 504 506, or any combination of them (under certain circumstances), that together define the machine's three-dimensional work envelope. FIG. 15 illustrates a workpiece where a "3-axis" machine is sufficient to machine the circular cavity 508 into the workpiece 500 by means of the process flowcharted in FIG. 18 described hereinafter. Yet another basic embodiment is a "4-axis" machine 600, which has all of the three-axis linear motion of the "3-axis" machine plus a "rotary axis" 510 to continuously re-orient the cutting tool's face 404 in any direction to maintain its perpendicularity to a level two-dimensional cutting path. Maintaining perpendicularity optimizes the performance of the cutting tool and thus maximizes the range of shapes the machine can cut. The mechanism for this fourth axis 510 can be either a rotary-axis tool holder 610 to which the cutting tool 400 is attached or a rotary-axis table 612 to which the workpiece 500 is attached. By either means, a "4-axis" machine is sufficient to machine the curved circular cavity 512 into the workpiece 500 illustrated in FIG. 16 by means of the process flowcharted in FIG. 19 described hereinafter.

Figure 18:
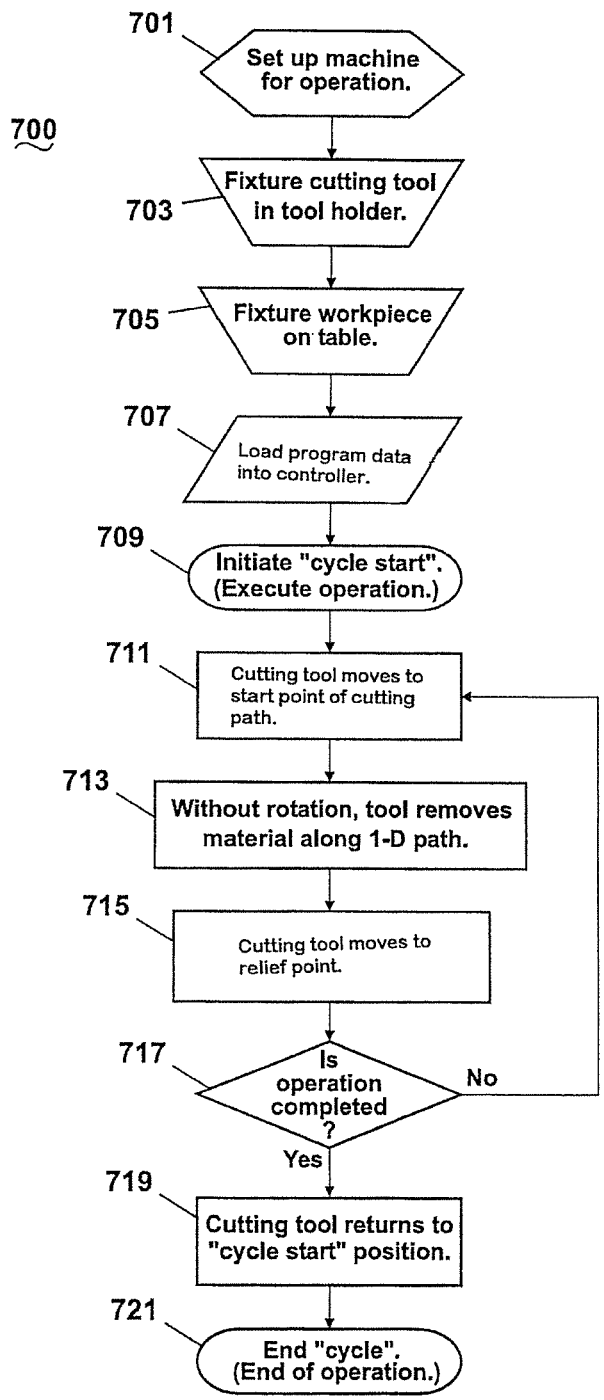
FIG. 18 is a flow chart of the non-spindle machining method of the present invention machining the part depicted in FIG. 15 in accordance with the "3-axis" embodiment of the present invention.

FIG. 18 is a flow chart of the non-spindle machining method of the present invention in which it is machining the part depicted in FIG. 15 in accordance with the "3-axis" embodiment of the present invention. The non-spindle machining method 700 includes the steps of setting up the machine for operation 701. A cutting tool is fixtured in a tool holder 703 and a workpiece is fixtured on a table 705. Tool and cutting path data is then loaded into the machine's controller 707 and a cycle start is initiated to execute operation 709. The tool then moves toward the workpiece to the start point of the first cutting path 711 and then removes material from the workpiece along a cutting path without spindle rotation 713. At the end point of the cutting path the tool moves to a relief point above the workpiece 715 and a determination is made if the operation is completed 717. If not, the operation continues with the cutting tool moving to the start point of the next cutting path 711. If the operation is completed, the cutting tool returns to the cycle start position 719 and the operation ends 721.

Figure 19:
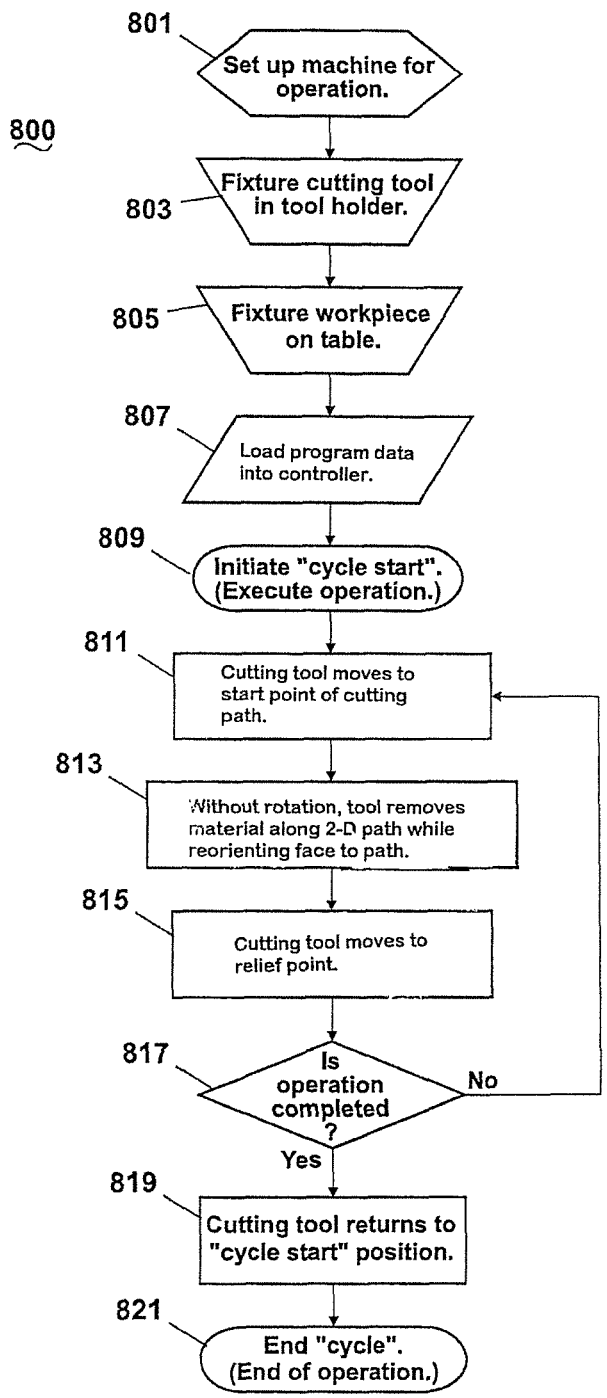
FIG. 19 is a flow chart of the non-spindle machining method of the present invention machining the part depicted in FIG. 16 in accordance with the "4-axis" embodiment of the present invention.

FIG. 19 is a flow chart of the non-spindle machining method of the present invention in which it is machining the part depicted in FIG. 16 in accordance with the "4-axis" embodiment of the present invention. The method 800 includes the steps of setting up the machine for operation 801 where the cutting tool is fixtured in a tool holder 803. A workpiece is then fixed on the table 805 and the tool and cutting path data is loaded into the controller 807. Cycle start is initiated 809 and the cutting tool moves toward the workpiece to the start part of the first cutting path 811. The cutting tool then removes material from the workpiece along a level 2-dimensional cutting path without spindle rotation while the tool holder continuously re-orients the tool to maintain the perpendicularity of the face of the cutting edge to the cutting path 813. At the end point of the cutting path the tool moves to a relief point above the workpiece 815. A determination is then made if the operation is completed 817. If not, the cutting tool moves to the start point of the next cutting path 811. If the operation is completed, then the cutting tool returns to the cycle start position 819 and the operation ends 821.

Still more complex embodiments are the "5-axis" and the "7-axis" machines. These embodiments have all of the three-axis linear and fourth-axis rotary motions of the "4-axis" machine plus additional rotary or tilt axes to orient the cutting tool's face in any direction to maintain its perpendicularity to any three-dimensional cutting path. These machines are unrestricted in the shapes and surfaces they can produce, including NURBS surfaces, by means of the process flowcharted in FIG. 20.

Flow Chart of the Method.

Figure 20:
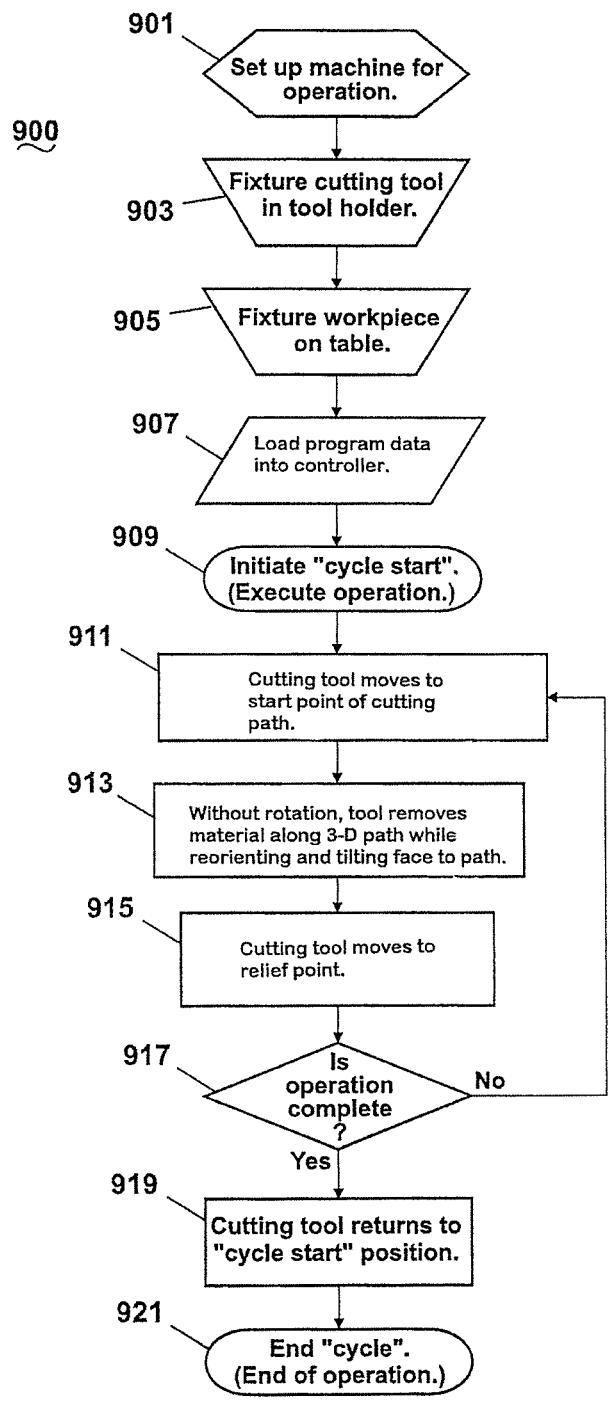
FIG. 20 is a flow chart of the non-spindle machining method of the present invention machining a complex surface, such as a NURBS surface, in accordance with a "5-axis" or "7-axis" embodiment of the present invention.

FIG. 20 is a flow chart of the non-spindle machining method in accordance with a "5-axis" or "7-axis" embodiment of the present invention. The process 900 includes the step of setting up the machine for operation 901 and fixturing the cutting tool in a tool holder 903. The workpiece is fixtured on the table 905 and the tool and cutting path is loaded into the controller 907. Cycle start is initiated 909 and the cutting tool moves to the start point of the first cutting path 911. The cutting tool then removes material from the workpiece along a 3-dimensional cutting path without spindle rotation while the tool holder continuously re-orients and tilts the tool to maintain the perpendicularity of the face of the cutting edge to the cutting path 913. A determination is made if the operation is completed 917. If not completed, the cutting tool moves to the start point of the next cutting path 911 and the operation continues. If the operation is complete, the cutting tool returns to the cycle start position 919 and the operation ends 921. Thus, the method of the present invention as described in FIGS. 18-20, overcome the limitations of lathes and mills in profiling operations by employing a non-spindle method of machining and eliminates milling for most profiling operations.

Figure 22:
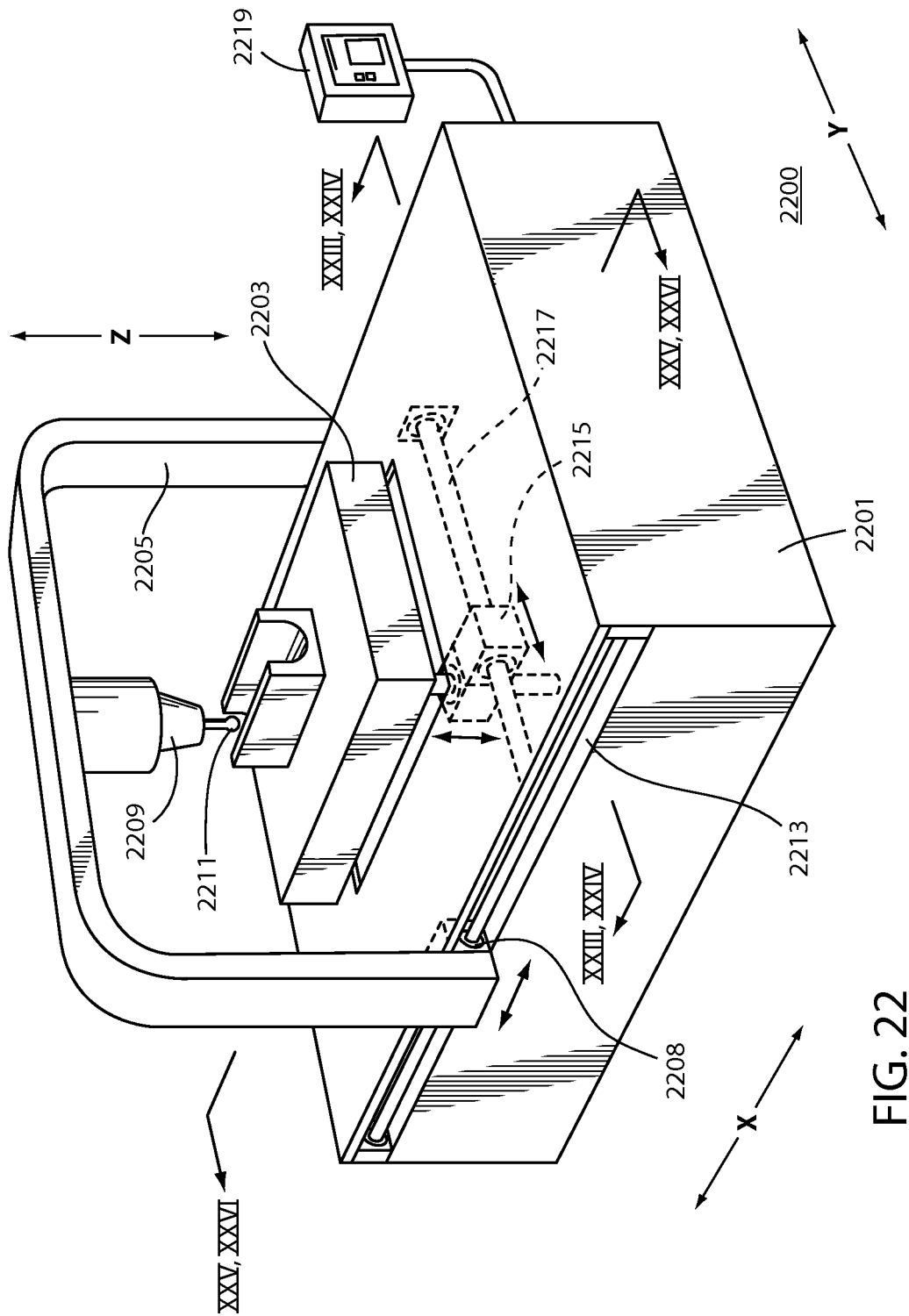
FIG. 22 is a perceptive view of a non-spindle vertical machining center using linear drives to achieve controlled fracturing in accordance with alternate embodiments of the invention.

In still another embodiment, FIG. 22 illustrates a non-spindle vertical machining center using one or more linear drive motors 2200 capable for achieving controlled fracturing machining of workpiece materials. The non-spindle vertical machining center 2200 includes a base 2201 that provides support for a work table 2203 which asked to hold a workpiece 2205 into a fixed position. Those skilled in the art will recognize that the work table 2203 may include one or more clamps, fasteners and/or a vice for holding the workpiece 2205 still in relation to the table 2203 during machining operations. Affixed atop the base 2201 is a flying bridge 2207 moves along an X-axis by the use of one or more linear drives 2208 positioned within the base 2201. Those skilled in the art will recognize that various combinations of both linear and rotary drives may also be used to control movement of the work table 2203 and flying bridge 2207. Moreover, the term "linear drive" encompasses chains, belts, ball screws, hydraulic and pneumatic cylinders, and electric linear motors.

The flying bridge 2207 is a substantially U-shaped member or tower and is manufactured to bear substantially large amounts of upward and downward force when cutting the workpiece using the controlled fracturing process. The linear drive operates by moving the bridge 2207 along a channel or track 2213 positioned within and at an outside edge of the base 2201. A cutting tool 2211 as described herein, is generally fixed in position, with regard to the flying bridge 2207, and uses a tool holder assembly 2209 to hold the cutting tool's face into a fixed position. Those skilled in the art will recognize that an electric motor can produce either rotary or linear motion depending on its configuration. An electric linear motor can be used as a linear drive for embodiments of the present invention. The linear drive works in a manner to propel and/or move a cutting tool 2211 along a cutting path with a force that is sufficient to induce controlled fracturing of the workpiece to remove material.

In order to freely move the table 2203 in both the Y-axis and Z-axis, one or more linear drives 2215 are used within the base 2201. Those skilled in the art will recognize that only linear motion (by means of linear drives of any type) are used herein without rotation of either the cutter or the workpiece about a spindle. The machine described herein uses linear motion solely to produce sufficient force to remove material from a workpiece along a multi-dimensional cutting path, unlike prior art machine tools that also require torque from a spindle to produce that force. This distinguishes the present invention from prior art spindle machine tools such as mills and lathes. Also, the machine as describe herein can do so along a 3-dimensional cutting path, unlike the restriction to a 1-dimensional cutting path of prior art non-spindle machine tools. This distinguishes the present invention from prior art non-spindle machine tools such as broachers, planers, and shapers.

In one embodiment, the base 2201 includes a void and/or cavity therein for allowing the linear drive(s) 2215 to move in Y and Z directions. The linear drives 2215 typically move along a shaft, rod and/or screw assembly 2217 solely in a linear or straight line motion at cutting speeds sufficient to achieve controlled fracturing as defined herein. No rotation about a spindle is used for either the cutting tool or the workpiece. Upper portions of the base 2201 can be removed for enabling the table 2203 to move freely. As seen in FIG. 22, this occurs by allowing the linear drive 2215 to move the work table 2203 in either a Y-axis and/or Z-axis for enabling the workpiece 2205 to remain in contact with the cutting tool 2211. As described herein, precision movements of the various linear drives 2208, 2215 etc. is accomplished though a microprocessor 2219 running software programming for creating predetermined cuts and shapes of the workpiece 2205. Although the linear drive 2215 is shown as a single unit for controlling motion of the work table 2203, it should be evident to those skilled in the art the a plurality of linear drive motors can be used in various configurations to achieve precision movement at speeds to induce controlled fracturing machining.

Figure 23:
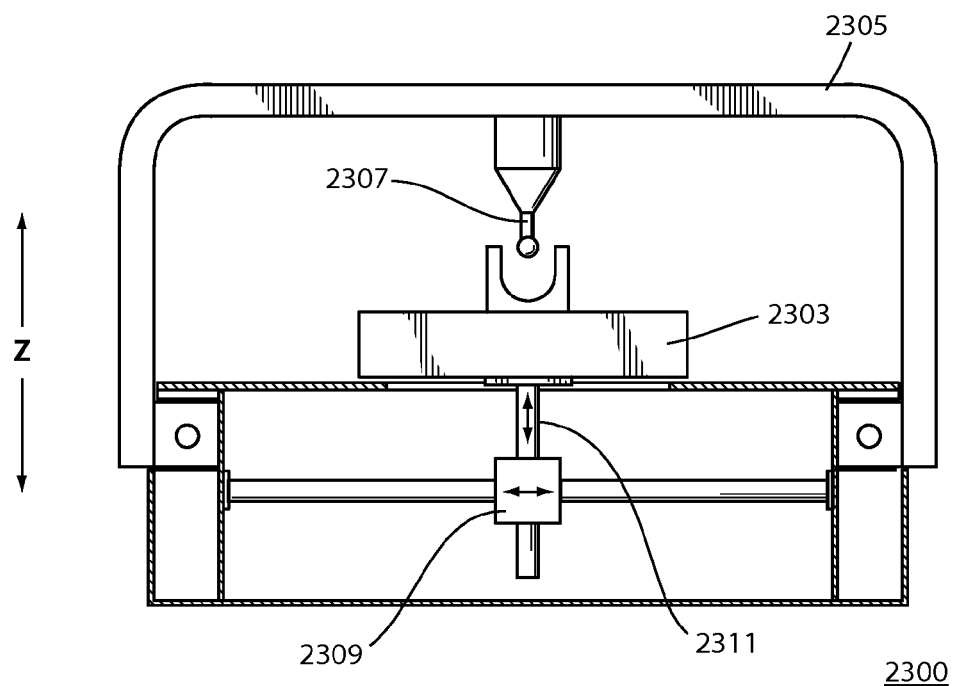
FIG. 23 is a side view of that illustrated in FIG. 22 where the machine tool is not engaged with the workpiece.
Figure 24:
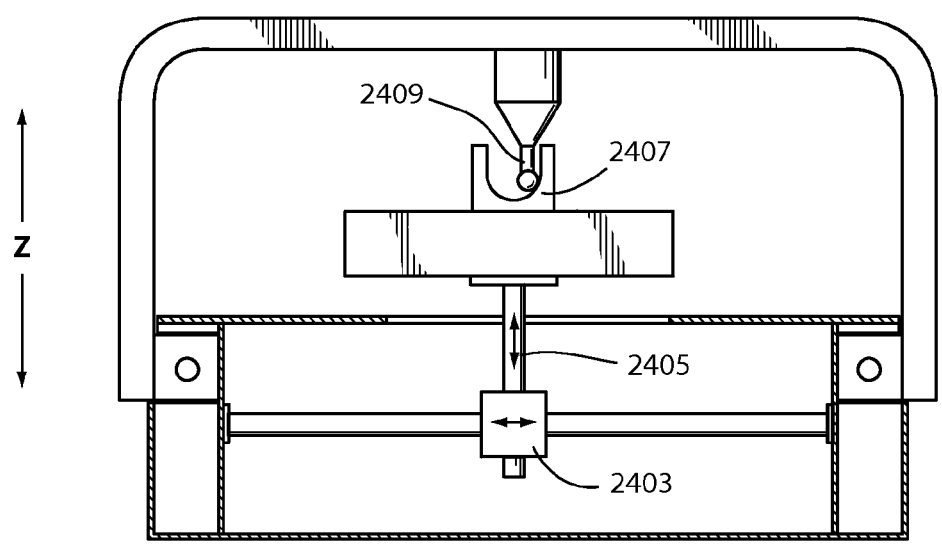
FIG. 24 is a side view of that illustrated in FIG. 22 where the machine tool is engaged with the workpiece.

FIG. 23 and FIG. 24 are side views showing movement of the table in the Z-axis. FIG. 23 illustrates a non-spindle vertical machine center 2300 where a workpiece 2301 is fixed on top of a table 2303. The flying bridge 2305 is positioned above the workpiece 2301 where a cutting tool 2307 moves linearly, without rotation of either the tool or the workpiece, to achieve material removal of the workpiece 2301 by a controlled fracturing process as described herein. In FIG. 23 a linear drive 2309 positions a shaft 2311 in a manner such that the cutting tool 2307 is not yet in contact with the workpiece 2303. As seen in FIG. 24, the non-spindle vertical machining center 2400 is shown where the work table 2401 is moved vertically on the Z-axis by enabling the linear drive 2403 to move the shaft 2405 vertically so the workpiece 2407 is in contact with the cutting tool 2409.

Figure 25:
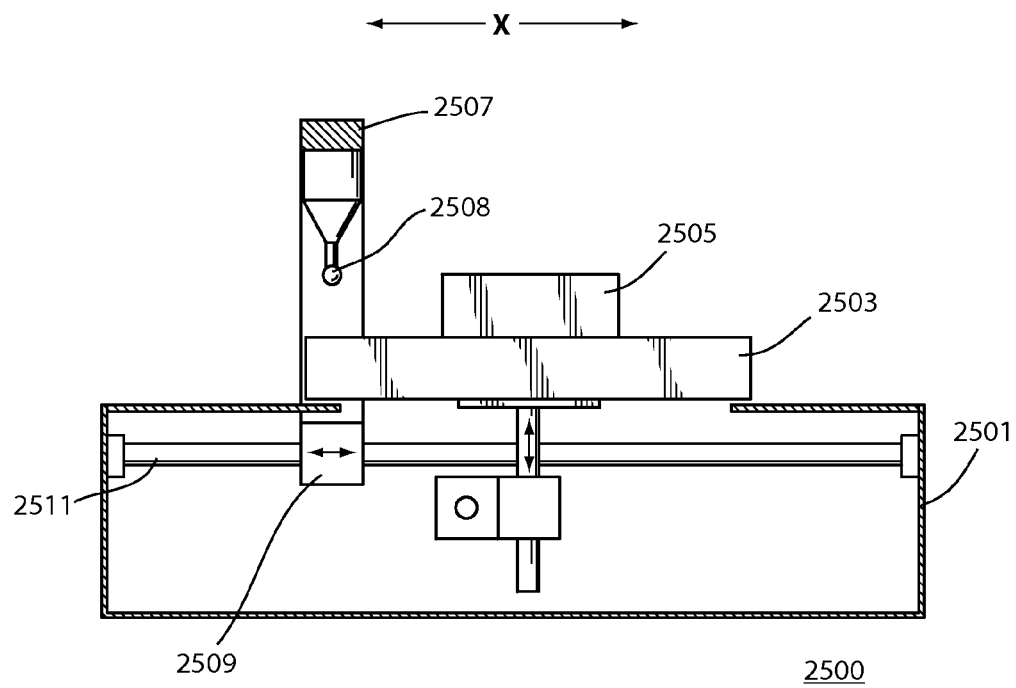
FIG. 25 is a side view of that illustrated in FIG. 22 where the flying bridge and cutting tool is adjacent to the workpiece.
Figure 26:
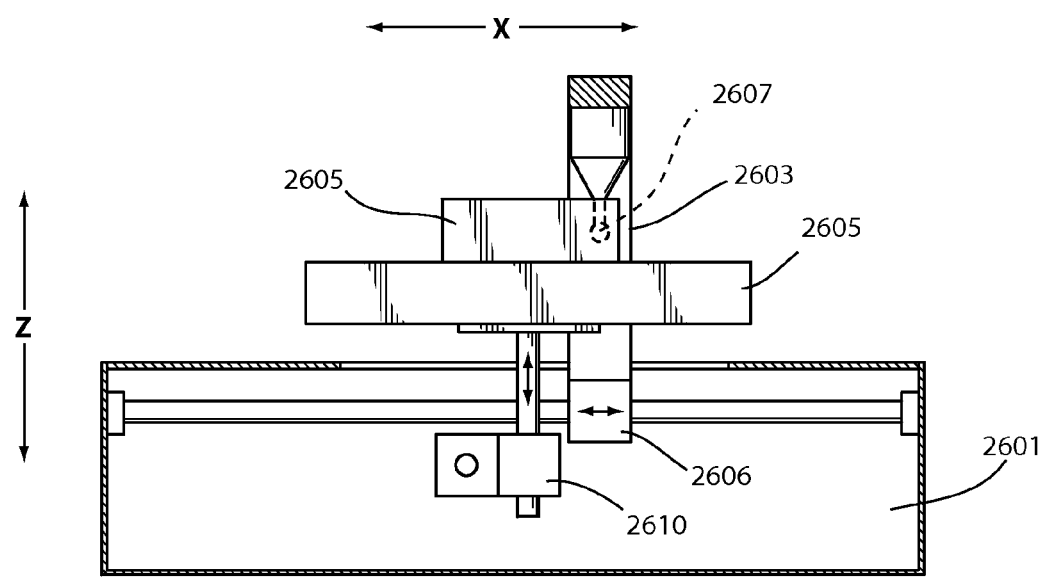
FIG. 26 is a side view of that illustrated in FIG. 22 where the flying bridge and cutting tool are engaged with the workpiece.

FIGS. 25 and 26 illustrate side views showing movement of the flying bridge in the X-axis. The non-spindle vertical machining center 2500 is shown where the work table sits atop the base 2501. The workpiece 2505 is on the worktable 2505 and positioned adjacent to the flying bridge 2507. As described herein, the flying bridge 2507 uses one or more linear drives 2509 to move the cutting tool 2508 to the workpiece 2509. The linear drive 2509 moves along a rod or track 2511 to position the cutting tool at a precise location in relation to the work piece 2505. FIG. 26 illustrates the non-spindle vertical machining center 2600 where the flying bridge 2603 has moved using the linear drive 2606 into a position such that the cutting tool 2607 is operatively engaged and/or touching with the workpiece 2605. Additionally, the work table 2609 has been moved vertically on the Z-axis using linear drive 2610 so that the workpiece 2609 can be accessed by the flying bridge 2603 and cutting tool 2607.

Figure 27:
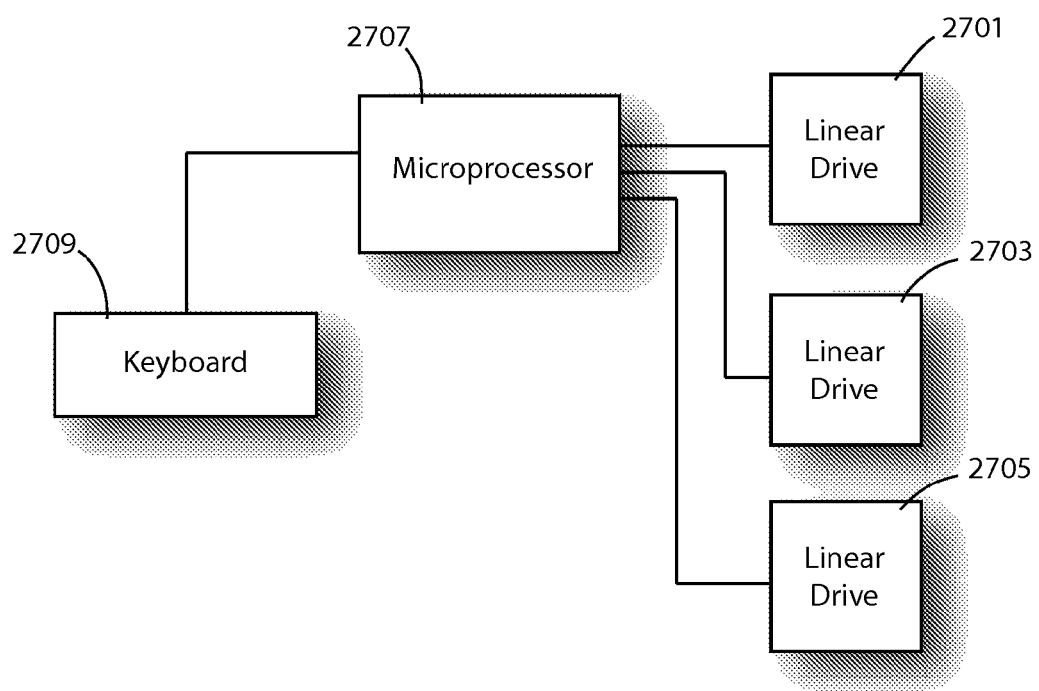
FIG. 27 is a block diagram showing microprocessor control of linear drives used in connection with the invention.

FIG. 27 is a block diagram illustrating the microprocessor control of one or more linear drives used in the non-spindle vertical machining center. The control system 2700 utilizes one or more microprocessors 2707 to control the linear drives 2701, 2703, 2705 used for controlling motion of the flying bridge and work table in the X-, Y-, and Z-axis. Those skilled in the art will recognize that since X-, Y-, and Z-axis can be independently controlled, 5-axis or 7-axis movement of the machining tool is possible to achieve the necessary curved or arced cutting of the tool path. A keyboard 2709 or other input device can be used by the user to control and/or enter programming code for governing the precision movement of the non-spindle vertical machining center.

Thus, the present invention is directed to a base section to which other machining components are attached directly or by intermediary devices and includes one or more linear drives. One or more cutting tools are affixed to at least one linear drive where the at least one drive moves the cutting tool with sufficient force to induce controlled fracturing. A work table affixed to the base for holding a workpiece in a fixed position in relation to the at least one table such that the at least one table moves independently of the cutting tool. A programmable controller is further configured to cause a cutting edge of the cutting tool to be in operative engagement with a workpiece. The workpiece is held by the table in order to cause the cutting edge to translate along the accurate path for cutting the workpiece. In use, the cutting tool is not rotated by a spindle as in milling nor is the workpiece that is held by the table, rotated by a spindle—as in turning processes. The cutting tool and the table move relative to one another along any three-dimensional path within a work envelope of the machining apparatus for profiling the workpiece into a predetermined shape.

While the present invention has been described in terms of the preferred embodiments discussed in the above specification, it will be understood by one skilled in the art that the present invention is not limited to these particular preferred embodiments, but includes any and all such modifications that are within the spirit and scope of the present invention as defined in the appended claims.

What is claimed is:

1. A non-spindle multi-axis machining apparatus comprising:
    a base section to which machine components are attached directly or by intermediary devices;
    at least one linear drive;
    a plurality of cutting tools affixed to at least one linear drive where the at least one drive moves at least one of the plurality cutting tools with sufficient force to induce controlled fracturing;
    at least one table affixed to the base for holding a workpiece in a fixed position in relation to the at least one table such that the at least one table moves independently of the cutting tool and is configured so the at least one linear drive moves the at least one table in both a vertical and horizontal axis relative to the base section;
    a programmable controller configured to cause a cutting edge of one of the plurality of cutting tools to be in operative engagement with the workpiece that is held by the table in order to cause the cutting edge to translate along an accurate path to cut the workpiece while the cutting tool is not rotated with a continuous milling-type rotation and while the workpiece that is held by the table is not rotated with a continuous turning-type rotation; and
    wherein the at least one cutting tool and the at least one table move relative to one another along any three-dimensional path within a work envelope of the machining apparatus for profiling the workpiece into a predetermined shape using a controlled fracturing process.

2. A non-spindle multi-axis machining apparatus as in claim 1, wherein the non-spindle multi-axis machining apparatus is a vertical machining center having a flying bridge for positioning the cutting tools in at least one axis relative to a workpiece.

3. A non-spindle multi-axis machining apparatus as in claim 1, wherein the flying bridge is moved using the at least one linear drive.

4. A non-spindle multi-axis machining apparatus as in claim 1, wherein the at least one table is moved using the at least one linear drive.

5. A non-spindle multi-axis machining apparatus as in claim 1, wherein the at least one linear drive is positioned within the base section.

6. A non-spindle multi-axis machining apparatus as in claim 1, wherein the at least one linear drive is comprised of: a first linear drive for moving a flying bridge in a first axis, a second linear drive for moving the work table in a second axis and a third linear drive for moving the work table in a third axis.

7. A non-spindle multi-axis machining apparatus for use in plastic deformation and controlled fracturing processes comprising:
    a base section to which machine components are attached directly or by intermediary devices;
    at least one cutting tool affixed to a flying bridge such that the flying bridge is moveable relative to the base section;
    at least one linear drive;
    at least one table affixed to the base for holding a workpiece into a fixed position in relation to the table such that the table moves independently of the at least one cutting tool and where the at least linear drive is configured to move the at least one table in both a vertical and horizontal axis relative to the base section; and
    wherein the cutting tool and the table are synchronized to produce a movement of the cutting tool through a workpiece along any three-dimensional path within the work envelope of the apparatus by a microprocessor enabling a predetermined force to be applied to the workpiece for profiling the workpiece into a predetermined shape using a controlled fracturing process.

8. A non-spindle multi-axis machining apparatus as in claim 7, wherein the non-spindle multi-axis machining apparatus is a vertical machining center having a flying bridge for positioning the cutting tools in at least one axis relative to a workpiece.

9. A non-spindle multi-axis machining apparatus as in claim 7, wherein the flying bridge is moved using the at least one linear drive.

10. A non-spindle multi-axis machining apparatus as in claim 7, wherein the at least one table is moved using the at least one linear drive.

11. A non-spindle multi-axis machining apparatus as in claim 7, wherein the at least one linear drive is positioned within the base section.

12. A non-spindle multi-axis machining apparatus as in claim 7, wherein the at least one linear drive is comprised of: a first linear drive for moving the flying bridge in a first axis, a second linear drive for moving the work table in a second axis and a third linear drive for moving the work table in a third axis.

13. A non-spindle multi-axis machining apparatus for machining a workpiece using a controlled fracturing process comprising:
- a base section to which machine components are attached directly or by intermediary devices;
- a flying bridge connected to the base section for moving at least one cutting tool along a first axis of movement;
- at least one table affixed to the base for holding a workpiece in a fixed position in relation to the at least one table such that the at least one table moves independently of the cutting tool and moves in both a second axis and third axis;
- a microprocessor controller configured to cause a cutting edge of one of the plurality of cutting tools to be in contact with the workpiece that is held by the table in order to cause the cutting edge to translate along an accurate cutting path to cut the workpiece such that the cutting tool or the at least one table is rotated with a continuous turning-type rotation;
- wherein the at least one cutting tool and the at least one table move relative to one another along any three-dimensional path within a work envelope of the machining apparatus for profiling the workpiece into a predetermined shape; and
- a first linear drive for moving the flying bridge in a first axis;
- a second linear drive for moving the table in the second axis;
- a third linear drive for moving the table in a third linear axis; and
- wherein the first linear drive, second linear drive and third linear drive move the cutting tool and workpiece with sufficient force to induce controlled fracturing of the workpiece and are each configured so the at least one linear drive moves the at least one table in a respective X, Y and Z axis relative to the base section.

14. A non-spindle multi-axis machining apparatus as in claim 13, wherein the base section houses the first linear drive, second linear drive and third linear drive.

15. A non-spindle multi-axis machining apparatus as in claim 13, wherein the at least one cutting tool is held into a fixed position below the flying bridge.

16. A non-spindle multi-axis machining apparatus as in claim 13, wherein the flying bridge moves the cutting tool along a linear path relative to the base section.

17. A non-spindle multi-axis machining apparatus as in claim 13, wherein the first linear drive, second linear drive and third linear drive move along a fixed shaft associated with each respective linear drive.

\* \* \* \* \*